(12) United States Patent
Godawarthy et al.

(10) Patent No.: US 12,506,248 B2
(45) Date of Patent: Dec. 23, 2025

(54) RADIO FREQUENCY IDENTIFICATION (RFID) ANTENNA AND COMMUNICATION SYSTEM

(71) Applicant: Hand Held Products, Inc., Charlotte, NC (US)

(72) Inventors: Kailash Kashyap Godawarthy, Charlotte, NC (US); Gourango Biswas, Charlotte, NC (US); Pankaj Kumar Pandey, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/764,856

(22) Filed: Jul. 5, 2024

(65) Prior Publication Data
US 2025/0030146 A1 Jan. 23, 2025

(30) Foreign Application Priority Data
Jul. 21, 2023 (IN) .............................. 202311049204

(51) Int. Cl.
*H01Q 1/22* (2006.01)
*G06K 19/077* (2006.01)
*H01Q 1/48* (2006.01)

(52) U.S. Cl.
CPC ..... *H01Q 1/2216* (2013.01); *G06K 19/07773* (2013.01); *H01Q 1/48* (2013.01)

(58) Field of Classification Search
CPC ...... H01Q 1/2216; H01Q 1/48; H01Q 1/2225; H01Q 1/2208; H01Q 21/065; H01Q 9/285; H01Q 9/0407; H01Q 5/328; H01Q 9/42; H01Q 9/0464; G06K 19/07773; G06K 19/07771; G06K 19/041; G06K 19/07718
See application file for complete search history.

(56) References Cited

U.S. PATENT DOCUMENTS

| | | |
|---|---|---|
| 7,994,999 B2 | 8/2011 | Maeda et al. |
| 2009/0153404 A1 | 6/2009 | Ryou et al. |

(Continued)

FOREIGN PATENT DOCUMENTS

| | | | | |
|---|---|---|---|---|
| CN | 109286071 A | | 1/2019 | |
| KR | 101288381 B1 | * | 7/2013 | ............... H01Q 1/38 |
| WO | WO-2009052234 A1 | * | 4/2009 | ........... H01Q 9/0407 |

OTHER PUBLICATIONS

Ground plane effects on planar inverted-F antenna (PIFA) performance (Year: 2003).*

(Continued)

*Primary Examiner* — Thien T Mai
(74) *Attorney, Agent, or Firm* — Alston & Bird LLP

(57) ABSTRACT

A radio frequency identification (RFID) antenna is provided. The RFID antenna includes, but not limited to, a printed circuit board (PCB). The PCB includes, but not limited to: a substrate; an etched metal layer on the substrate, where the etched metal layer comprises: a radiating element positioned on the substrate having a loop structure, where the loop structure comprises two first chamfered edges, and the first chamfered edges are position in opposing corners of the loop structure; and a ground element positioned on the substrate having comprising a slotted structure that is concentric with the loop structure and is positioned in an inner region of the loop structure.

17 Claims, 11 Drawing Sheets

(56) References Cited

U.S. PATENT DOCUMENTS

2011/0102269 A1    5/2011  Sato et al.
2018/0205151 A1*   7/2018  Celik ...................... H01Q 5/40

OTHER PUBLICATIONS

Circularly Polarized Traveling-Wave Array Antenna With Novel Microstrip Patch Element (Year: 2007).*
Extended European Search Report Mailed on Dec. 11, 2024 for EP Application No. 24181832, 14 page(s).
Li Yujie et al., A compact dual band ring antenna with embedding grounded patches,, Jul. 7, 2019, IEEE International Symposium On Antennas and Propagation and USNC-URSI Radio Science Meeting, 1551-1552.

* cited by examiner ized to one or more embodiments, and the same reference numbers in the figures indicate references to the same element or feature. In addition, one or more elements may not necessarily be shown to scale and may be schematic illustrations.

RADIO FREQUENCY IDENTIFICATION (RFID) ANTENNA AND COMMUNICATION SYSTEM

CROSS-REFERENCE TO RELATED APPLICATIONS

This application claims priority pursuant to 35 U.S.C. 119(a) to Indian Application No. 202311049204, filed Jul. 21, 2023, which application is incorporated herein by reference in its entirety.

FIELD OF THE INVENTION

Exemplary embodiments of the present disclosure relate generally to radio frequency identification (RFID) communication systems, and more particularly, in some examples, to RFID antennas of the RFID communication systems.

BACKGROUND

Applicant has identified many technical challenges and difficulties associated with compact RFID reader antenna assemblies. Through applied effort, ingenuity, and innovation, Applicant has solved problems relating to compact RFID reader antenna assemblies by developing solutions embodied in the present disclosure, which are described in detail below.

BRIEF SUMMARY

Various embodiments described herein relate to components, apparatuses, and systems for monitoring an internal organ temperature.

In accordance with various embodiments of the present disclosure, a radio frequency identification (RFID) antenna is provided. The RFID antenna includes, but not limited to, a printed circuit board (PCB). The PCB includes, but not limited to: a substrate; an etched metal layer on the substrate, where the etched metal layer comprises: a radiating element positioned on the substrate having a loop structure, where the loop structure comprises two first chamfered edges and the two first chamfered edges are positioned in opposite corners of the loop structure; and a ground element positioned on the substrate having a slotted structure that is concentric with the loop structure and is positioned in an inner region of the loop structure.

In some embodiments, the PCB further includes a metal cavity structure, where the metal cavity encloses the PCB, such that a radiation of electro-magnetic waves from the radiating element emits a directional radiation pattern.

In some embodiments, the metal cavity structure comprises a metal backplate and metal wall plates, where the metal backplate is positioned on a side of the substrate away from the etched metal layer and the metal wall plates are positioned on sidewalls of PCB.

In some embodiments, the metal cavity structure further comprises a plastic sheet to cover the PCB in the metal cavity structure.

In some embodiments, the substrate is made of a material of flame retardant (FR4) or Teflon.

In some embodiments, the slotted structure further comprises chamfered edges on at least two opposite corners of the slotted structure.

In some embodiments, each of the two first chamfered edges of the loop structure is at 45° with respect to an adjacent side of the loop structure.

In some embodiments, the loop structure further comprises two second chamfered edges in second two opposite corners of the loop structure.

In some embodiments, the two first chamfered edges of the loop structure have a first width, the two second chamfered edges of the loop structure have a second width, and the first width is different from the second width.

In some embodiments, the slotted structure further comprises two first chamfered edges on first two opposite corners of the slotted structure and two second chamfered edges on second two opposite corners of the slotted structure.

In some embodiments, each of the two second chamfered edges of the loop structure is at 45° with respect to an adjacent side of the loop structure.

In some embodiments, electro-magnetic waves radiated from the radiating element are circularly polarized.

In some embodiments, each of the two first chamfered edges of the loop structure is at 45° with respect to an adjacent side of the loop structure.

According to another embodiment, a radio frequency identification (RFID) communication system is provided. The RFID communication system includes, but not limited to, an RFID antenna. The RFID antenna includes, but not limited to a printed circuit board (PCB). The PCB includes, but not limited to: a substrate; an etched metal layer on the substrate, where the etched metal layer comprises: a radiating element positioned on the substrate having a loop structure, where the loop structure comprises two first chamfered edges, and the first two chamfered edges are positioned in opposite corners of the loop structure; and a ground element positioned on the substrate having comprising a slotted structure that is concentric with the loop structure and is positioned in an inner region of the loop structure.

In some embodiments, the RFID communication system further includes a controller, communicatively coupled to the radiating element and the ground element, where the controller is configured to cause the radiating element to transmit or radiate electro-magnetic waves into space or capture incoming electro-magnetic waves for reception.

According to another embodiment, a radio frequency identification (RFID) antenna is provided. The RFID antenna includes, but not limited to, a printed circuit board (PCB), wherein the PCB includes: a substrate; an etched metal layer on the substrate, wherein the etched metal layer includes: a radiating element positioned on the substrate having a loop structure, wherein the loop structure includes four first chamfered edges positioned in four corners of the loop structure and four second chamfered edges positioned on the four corners of the loop structure; and a ground element positioned on the substrate having a slotted structure that is concentric with the loop structure and positioned in an inner region of the loop structure, wherein the slotted structure further includes four third chamfered edges on the four corners of the slotted structure.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
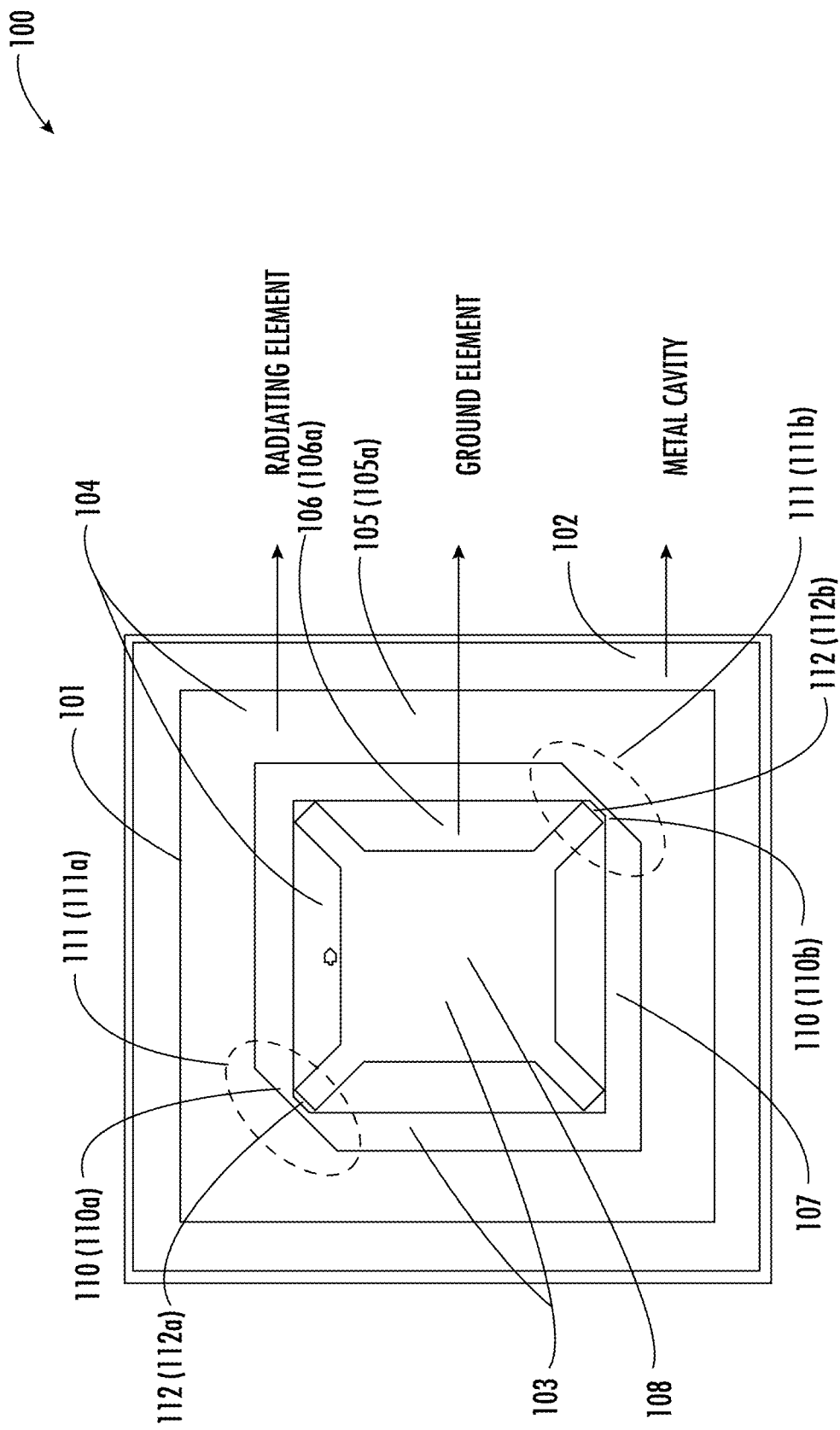
FIG. 1 illustrates an example diagram illustrating an example RFID antenna, in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as "comprises", "includes", and "having" should be understood to provide support for narrower terms such as "consisting of", "consisting essentially of", and "comprised substantially of".

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "loop structure" is used herein to correspond to a closed loop structure formed in a shape of a loop. In an example embodiment, the closed loop structure may comprise four sides connected by four corners at right angles to each other, and each side of the loop is parallel to the opposite side and all four sides have a same length. Alternatively or additionally, other shapes may take the form of a loop structure, such as a rectangular shape.

The term "slotted structure" is used herein to correspond to a loop shaped structure with a slot or an opening positioned inside of the loop shaped structure. In an example embodiment, the slot or the opening are in a shape of rectangle and have a same width and a same length.

An RFID reader antenna in an RFID communication system transmits, in some examples, interrogation signals in form of electro-magnetic waves to RFID tags disposed on respective objects located in a read zone. In response to the interrogation signals and in some examples, the RFID tags perform backscattering modulation by modulating a magnitude and a phase of scattered electro-magnetic waves of the electro-magnetic waves transmitted from the RFID reader antenna. The backscattered modulated electro-magnetic waves, which, in some examples, comprise information about corresponding RFID tags, are returned to the RFID reader antenna. Accordingly, the RFID reader antenna processes information stored in the internal memory units of the respective RFID tags. In an instance in which the RFID tag is a passive tag, the RFID tag also harvests energy from the interrogation signal from the RFID reader antenna.

The RFID reader antenna and/or RFID communication system may be applicable in a variety of application areas, such as, but not limited to, tracking automobiles, equipment, parts, components, tools or other assets in a manufacturing facility or assembling facility, or in a retail lot, warehouse, vehicle, cargo container, storage area, hospital, or other facility in which tracking of assets is required.

Various example embodiments address exemplary technical problems associated with the RFID reader antenna (e.g., RFID reader antenna). As understood by those of skill in the field to which the present disclosure pertains, for example, an RFID reader antenna may be customized to have a compact size while keeping a low manufacturing cost and good performance for the RFID reader antenna, such that the RFID reader antenna can be easily integrated with other terminal devices, in some examples.

Furthermore, in some examples, the communication between the RFID reader antenna and the RFID tags may be affected or otherwise impacted by other objects (e.g., electronic devices). For example, an electro-magnetic signal radiated from other electronic devices may affect or otherwise impact the communication between the RFID reader antenna and the RFID tags. Therefore, there is a need to improve the signal gain of the RFID reader antenna.

To address at least these exemplary problems as well as others, an example RFID antenna described herein comprises a single monolithic printed circuit board (PCB). For example, the PCB may comprise an etched metal layer on a substrate, where the etched metal layer has a loop structure as the radiating element and a slotted structure as the ground element. In some examples, the loop structure and the slotted structure may have chamfered edges at corresponding corners, such that the RFID antenna is able to operate in a circular polarization when a feed to the RFID antenna is varying the phase from 0° to 90°, to 180°, and further to 270°. For example, the circularly polarized (CP) gain of the RFID antenna may reach a peak of 6.5 decibels isotropic circular (dBiC). In some example, the RFID antenna may have a compact size (e.g., 12 cm by 12 cm) comparing to a traditional RFID antenna (e.g., 15 cm by 15 cm). The main advantage of the example RFID antenna is, in some examples, a compact size that is achieved by a loop structure, such that the RFID antenna is easy to be integrated into the other terminal devices. In addition, in some examples, the working principle of the circularly polarized RFID antenna is achieved by the loop structure with chamfered edges in opposite corners, such that the manufacturing cost is lowered and the performance is enhanced, in some examples.

In alternative or additional examples, the example RFID antenna may further comprise a metal cavity structure to enclose the PCB from five sides while leaving one side open for the radiation of electro-magnetic waves from the radiating element. For example, the radiation of electro-magnetic waves from the radiating element may have a directional radiation pattern while the detuning due to objects (e.g., electronic devices) located close to the five sides may be minimized, in some examples.

Having described example embodiments of the present disclosure generally, particular features and functionality of the various devices are hereinafter described.

The components illustrated in the figures represent components that may or may not be present in various embodiments of the disclosure described herein such that embodiments may include fewer or more components than those shown in the figures while not departing from the scope of the disclosure.

Referring now to FIG. 1, an example diagram illustrating an example RFID antenna 100 in accordance with some example embodiments described herein is provided. As shown in FIG. 1, in some examples, the example RFID antenna 100 may comprise a printed circuit board (PCB) 101 and a metal cavity structure 102. For example, the PCB 101 may be positioned in the metal cavity structure 102, such that the metal cavity structure 102 encloses the PCB 101 from at least five sides.

In some embodiments, the PCB 101 may comprise a substrate 103 and an etched metal layer 104 on the substrate 103. In some examples, the substrate 103 may be made of a glass-reinforced epoxy laminate material. For example, the substrate 103 may be made of a material of flame retardant (FR4), Teflon, or other PCB materials.

In some embodiments, the etched metal layer 104 may be a single metal layer. For example, the etched metal layer 104 may be an etched single copper layer. In some examples, the etched metal layer 104 may comprise a radiating element 105 and a ground element 106. For example, the radiating element 105 and the ground element 106 may be formed on the substrate 103.

In some embodiments, the radiating element 105 may be configured to transmit or radiate electro-magnetic waves into space or capture incoming electro-magnetic waves for reception, such that the example RFID antenna 100 may be able to communicate with a tag antenna (not shown). For example, the radiating element 105 may be configured to transmit an electro-magnetic signal to an RFID passive tag antenna to excite the RFID passive tag antenna. In some examples, tag integrated circuit (IC) information may be transmitted by the RFID passive tag antenna back to the example RFID antenna 100. In some examples, the electro-magnetic waves radiated from the radiating element 105 may be circularly polarized.

In some embodiments, the radiating element 105 may have a loop structure 105a. For example, the loop structure 105a may be a closed loop structure formed in a shape of a loop. In some examples, the loop structure 105a comprises two first chamfered edges 110 (e.g., 110a and 110b) formed in first opposite corners 111 (e.g., 111a and 111b) of the loop structure 105a. For examples, the two first chamfered edges 110 (e.g., 110a and 110b) may be formed in the first opposite corners 111 (e.g., 111a and 111b) from inside of the loop structure 105a.

In some examples, the loop structure may be a square loop structure.

In some examples, each of the two first chamfered edges 110 (e.g., 110a and 110b) may be positioned in each of the first opposite corners 111 (e.g., 111a and 111b) from inside of the loop structure 105a, such that a beveled or angled surface (not shown) may be formed. For example, each of the two first chamfered edges 110 (e.g., 110a and 110b) may form a sloping transition between adjacent sides of the loop structure 105a.

In some examples, each of the two first chamfered edges 110 (e.g., 110a and 110b) may be at 45° with respect to an adjacent side of the loop structure 105a.

In some embodiments, the ground element 106 on the substrate 103 may have a slotted structure 106a concentric with the loop structure 105a. For example, the slotted structure 106a may be a square or rectangular shaped structure with a slot or an opening 108 positioned at the center of the square shaped structure. In some examples, a diagonal (not shown) of the slotted structure 106a may be aligned with a diagonal (not shown) of the loop structure 105a.

In some embodiments, the slotted structure 106a may be positioned in an inner region 107 of the loop structure 105a. In some examples, the slotted structure 106a may comprise two first chamfered edges 112 (e.g., 112a and 112b) formed on first opposite corners 111 (e.g., 111a and 111b) of the slotted structure 106a. For examples, the two first chamfered edges 112 (e.g., 112a and 112b) may be formed on the first opposite corners 111 (e.g., 111a and 111b) from outside of the slotted structure 106a.

In some examples, each of the two first chamfered edges 112 (e.g., 112a and 112b) of the slotted structure 106a may be positioned on each of the first opposite corners 111 (e.g., 111a and 111b) from outside of the slotted structure 106a, such that a beveled or angled surface (not shown) may be formed. For example, each of the two first chamfered edges 112 (e.g., 112a and 112b) of the slotted structure 106a may form a sloping transition between adjacent sides of the slotted structure 106a.

Figure 2:
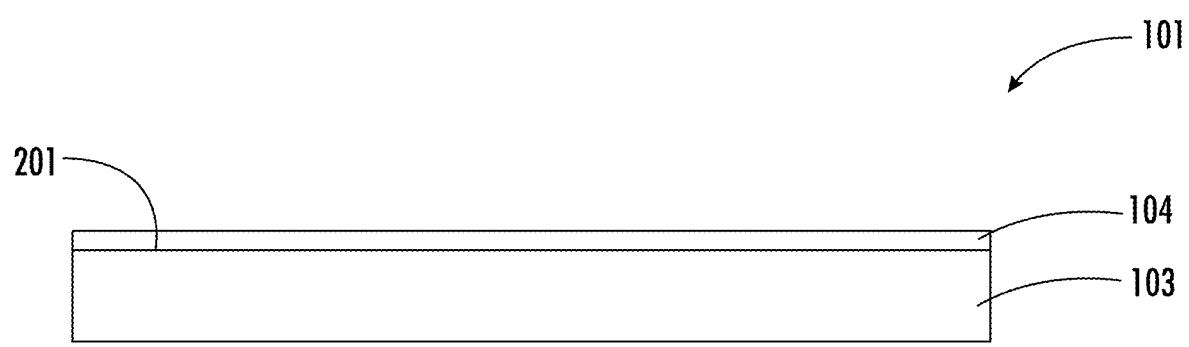
FIG. 2 illustrates an example diagram illustrating a printed circuit board (PCB), in accordance with various embodiments of the present disclosure.

Referring now to FIG. 2, an example diagram illustrating a printed circuit board (PCB) 101 in accordance with some example embodiments described herein is provided. As shown in FIG. 2, in some examples, the PCB 101 may comprise a substrate 103 and an etched metal layer 104 on the substrate 103. In some examples, the substrate 103 may be made of a glass-reinforced epoxy laminate material. For example, the substrate 103 may be made of a material of flame retardant (FR4), Teflon, or other PCB materials.

In some embodiments, the etched metal layer 104 may be a single metal layer. For example, the single metal layer may be an etched single copper layer. Alternatively or additionally, the single metal layer may be made of other metal materials, such as, but not limited to, brass, silver, and gold.

In some examples, the etched metal layer 104 may be formed on a top surface 201 of the substrate 103.

Figure 3:
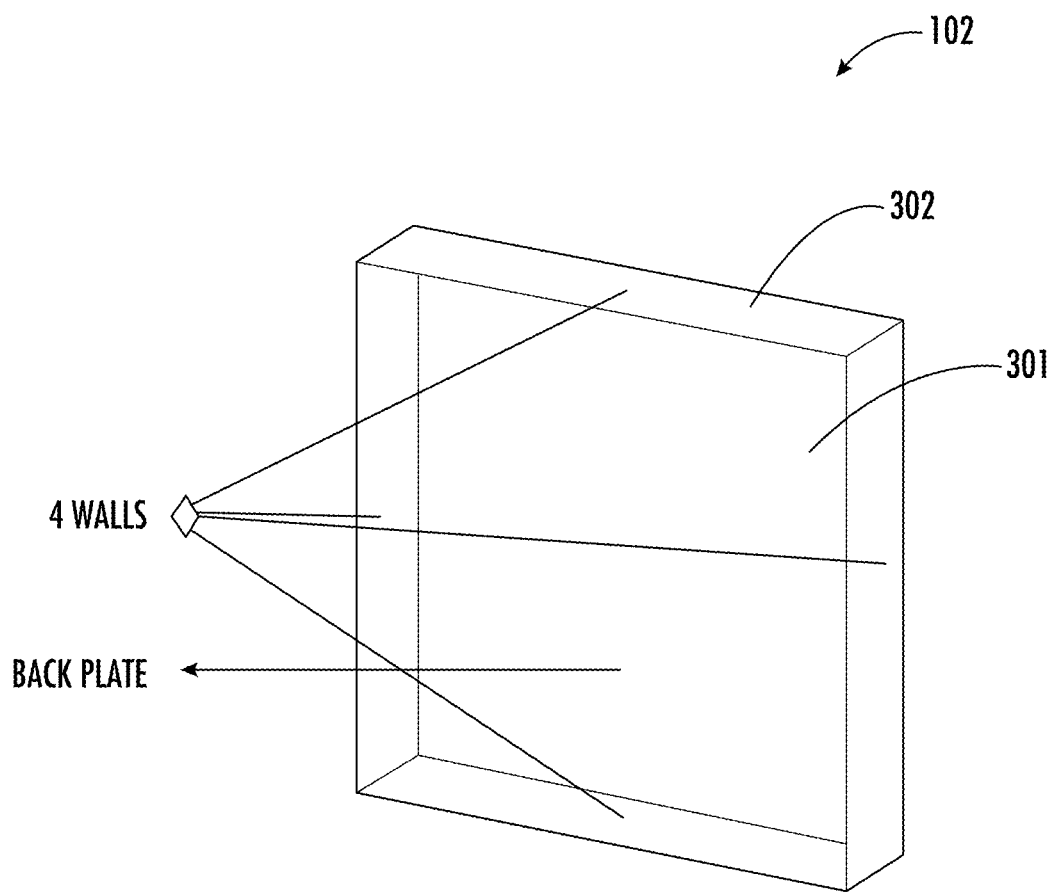
FIG. 3 illustrates an example diagram illustrating a metal cavity structure, in accordance with various embodiments of the present disclosure.

Referring now to FIG. 3, an example diagram illustrating a metal cavity structure 102 in accordance with some example embodiments described herein is provided. As shown in FIG. 3, in some examples, the metal cavity structure 102 may comprise a metal backplate 301 and four metal wall plates 302. For example, the metal backplate 301 may be positioned on a side of the substrate 103 away from the etched metal layer 104 and the four metal wall plates 302 may be positioned on sidewalls of the PCB 101.

In some embodiments, the metal cavity structure 102 may be configured to enclose the PCB 101, such that a radiation of electro-magnetic waves from the radiating element 105 has a directional radiation pattern.

In some examples, the metal cavity structure 102 may cover the PCB 101 from five sides (e.g., a side facing the metal backplate 301 and four sides facing the metal wall plates 302) while leaving one side open for the radiation of electro-magnetic waves from the radiating element 105.

In some examples, the metal backplate 301 may be utilized as a reflector to reflect electro-magnetic waves radiated or transmitted from the radiating element 105, such that the radiation of electro-magnetic waves from the radiating element 105 may have the directional radiation pattern. In some examples, four metal wall plates 302 may be utilized to reflect any electro-magnetic waves from nearby objects. For example, the nearby objects may be electrical devices located close to the metal cavity structure 102.

Figure 4:
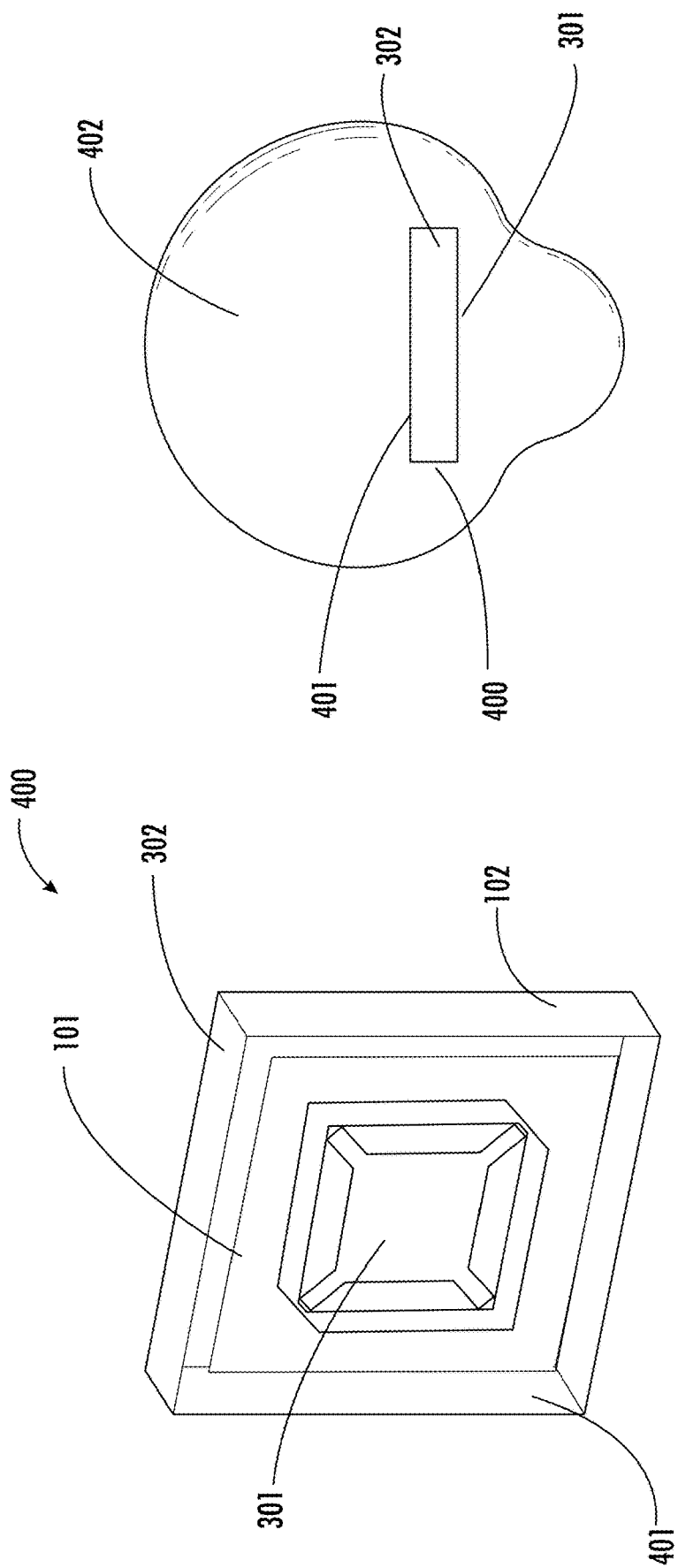
FIG. 4 illustrates an example diagram illustrating an example RFID antenna and an example radiation pattern of the example RFID antenna, in accordance with various embodiments of the present disclosure.

Referring now to FIG. 4, an example diagram illustrating an example RFID antenna 400 and an example radiation pattern of the example RFID antenna 400 in accordance with some example embodiments described herein is provided.

As shown on the left section of FIG. 4, in some examples, the example RFID antenna 400 may comprise a printed circuit board (PCB) 101 and a metal cavity structure 102. For example, the PCB 101 may be positioned in the metal cavity structure 102, such that the metal cavity structure 102 encloses the PCB 101. In some examples, the metal cavity structure 102 may comprise a metal backplate 301 and four metal wall plates 302.

In some embodiments, the metal cavity structure 102 may cover the PCB 101 from five sides (e.g., sides facing the metal backplate 301 and four metal wall plates 302) while leaving a remaining side open for the radiation of electro-magnetic waves from the radiating element 105.

In some examples, the metal cavity structure 102 may further comprise a cover 401 to protect the PCB 101. For example, the cover 401 may be made of a material (e.g., plastic), such that the radiation of electro-magnetic waves from the radiating element 105 may pass through.

As shown on the right section of FIG. 4, in some examples, the radiation of electro-magnetic waves from the radiating element 105 may have a directional radiation pattern. For example, radiation energy of the electro-magnetic waves may be concentrated in a main lobe 402 of the directional radiation pattern. In some examples, the main lobe 402 may be positioned on a side of the cover 401 away from the metal backplate 301.

For example, the metal backplate 301 may be positioned on a side of the substrate 103 away from the etched metal layer 104 and the four metal wall plates 302 may be on sidewalls of the PCB 101.

Figure 5:
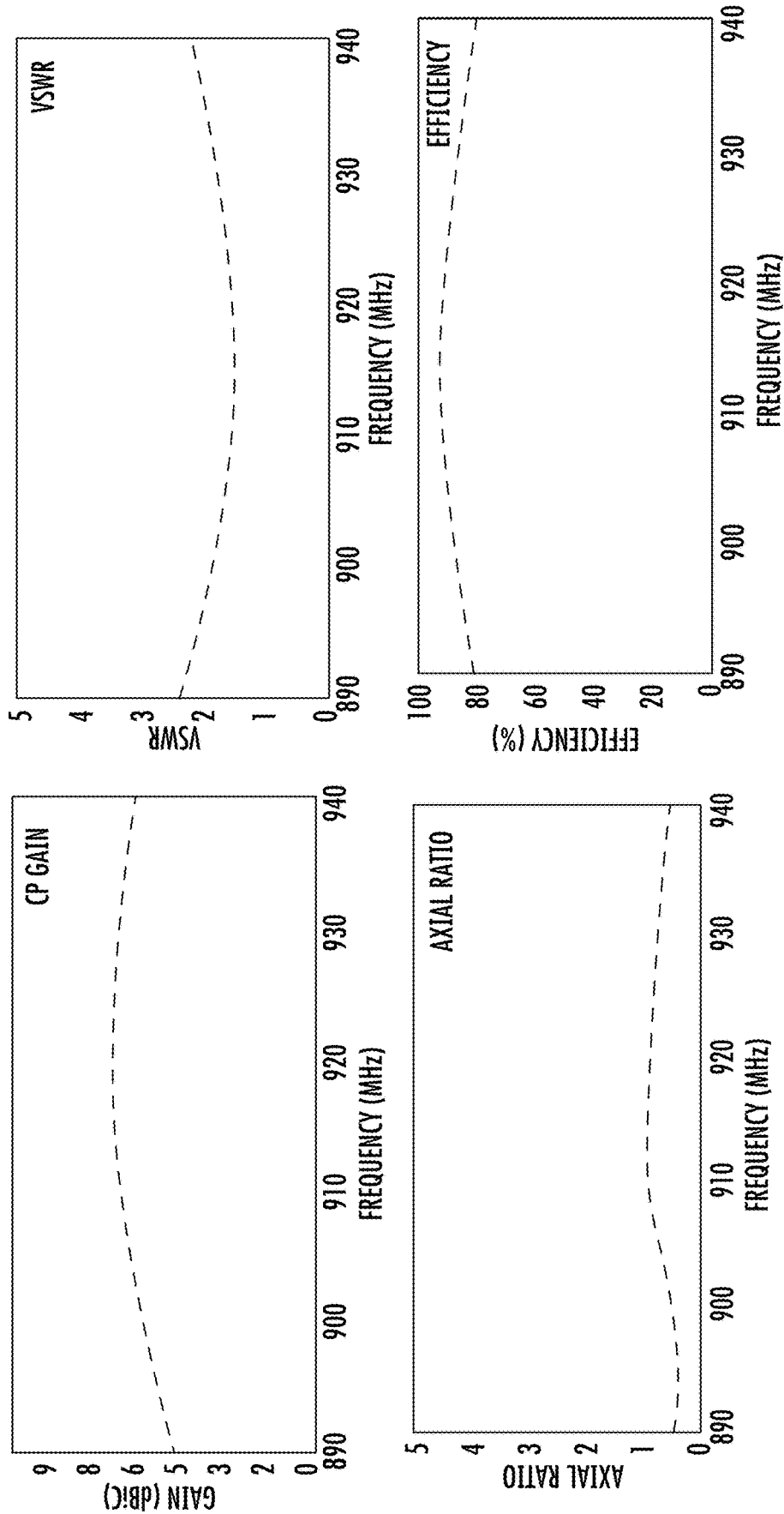
FIG. 5 illustrates example curves illustrating a circularly polarized (CP) gain, a voltage standing wave ratio (VSWR), an axial ratio, and an efficiency vs a frequency of an example RFID antenna, in accordance with various embodiments of the present disclosure.

Referring now to FIG. 5, example curves illustrating a circularly polarized (CP) gain, a voltage standing wave ratio (VSWR), an axial ratio, and an efficiency vs a frequency of an example RFID antenna 100 in accordance with some example embodiments described herein are provided.

As shown on the left top section of FIG. 5, in some examples, a peak CP gain of the example RFID antenna 100 may be around 6.5 dBiC when the frequency of the electro-magnetic signal is varying in a range from 890 MHz to 940 MHz.

As shown on the right top section of FIG. 5, in some examples, the VSWR of the example RFID antenna 100 may be around 1.5:1 when the frequency of the electro-magnetic signal is around 910 MHz.

As shown on the left bottom section of FIG. 5, in some examples, the axial ratio of the example RFID antenna 100 may be equal to 1 when the frequency of the electro-magnetic signal is around 915 MHz.

As shown on the right bottom section of FIG. 5, in some examples, the efficiency of the example RFID antenna 100 may be equal to 90% when the frequency of the electro-magnetic signal is approximately 915 MHz.

Figure 6:
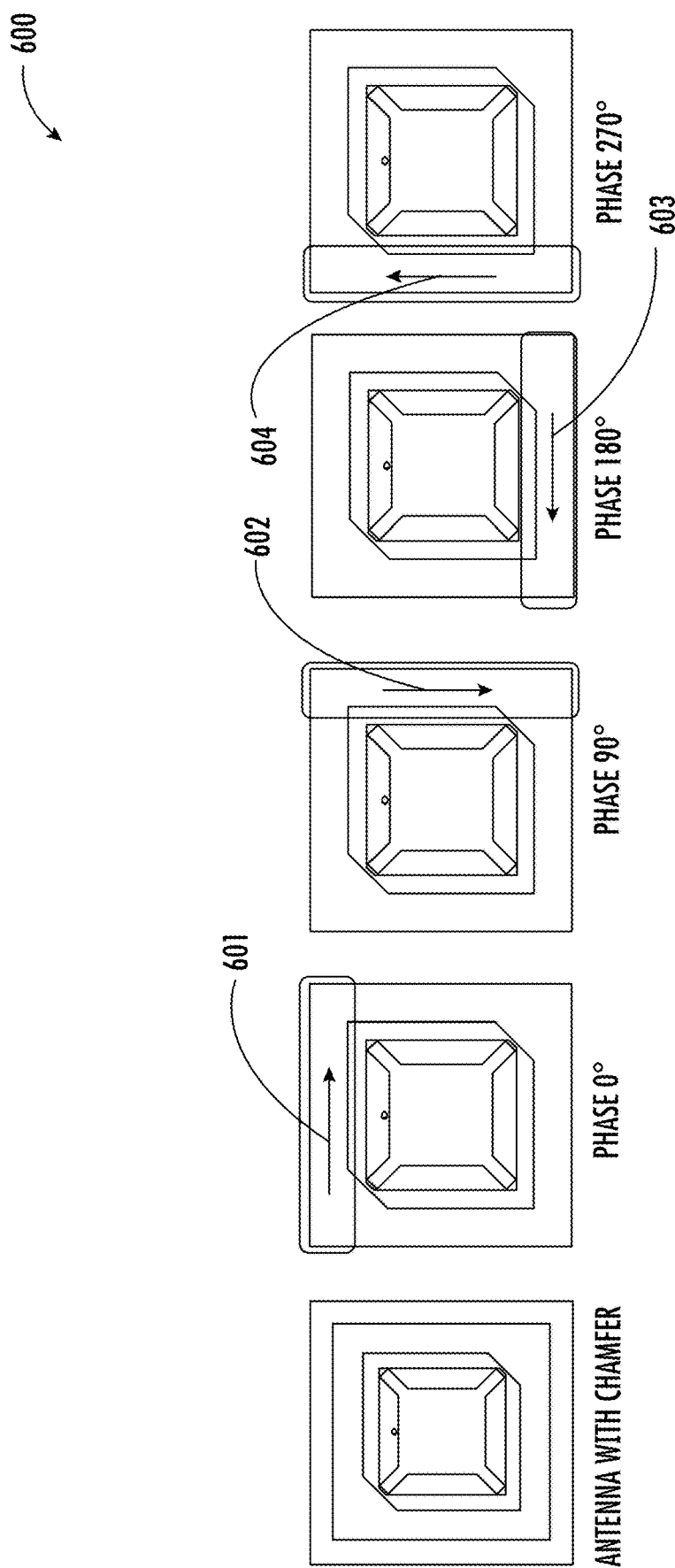
FIG. 6 illustrates an example diagram illustrating a current distribution on a surface of an example RFID antenna, in accordance with various embodiments of the present disclosure.

Referring now to FIG. 6, an example diagram illustrating a current distribution on a surface of an example RFID antenna 100 in accordance with some example embodiments described herein is provided.

In some embodiments, an EM field generated by the example RFID antenna 100 may be a combination of an electric field and a magnetic field. For example, the electric field may be directly proportional to a current on the surface of the example RFID antenna 100. For example, the electric field E may be calculated with following equation (Eq. 1).

$$E = J/\sigma \qquad \text{Eq. 1}$$

where J is a current density on the surface of the RFID antenna, and σ is a conductivity of the material of the RFID antenna.

For example, the magnetic field may be directly proportional to a voltage on the surface of the example RFID antenna 100. For example, the magnetic field B may be calculated with following equation (Eq. 2).

$$B = V/L \qquad \text{Eq. 2}$$

where V is the voltage on the surface of the RFID antenna, and L is an inductance of the material of the RFID antenna.

In some embodiments, the current on the surface of the example RFID antenna 100 may be visualized when the current on the surface of the example RFID antenna 100 is fed with different phases. For example, the current on the surface of the example RFID antenna 100 may change alone when a phase of a feed to the example RFID antenna 100 is changing between 0°, 90°, 180°, and 270°.

For example, a direction of the current may be in a horizontal direction 601 when on the feed to the example RFID antenna 100 has a phase at 0°. For example, a direction of the current may be in a vertical direction 602 when on the feed to the example RFID antenna 100 has a phase at 90°. For example, a direction of the current may be in a horizontal direction 603 when on the feed to the example RFID antenna 100 has a phase at 180°. For example, a direction of the current may be in a vertical direction 604 when on the feed to the example RFID antenna 100 has a phase at 270°.

For example, a circular polarization may be achieved when the phase feeding approach is implemented in the example RFID antenna 100.

In some embodiments, the example RFID antenna 100 may be operating in a circular polarization. As shown in FIG. 6, in some examples, the current on the surface of the example RFID antenna 100 may be changing in a circular fashion when the current on the surface of the example RFID antenna 100 is varying the phase from 0° to 90°, to 180°, and further to 270°.

Figure 7A:
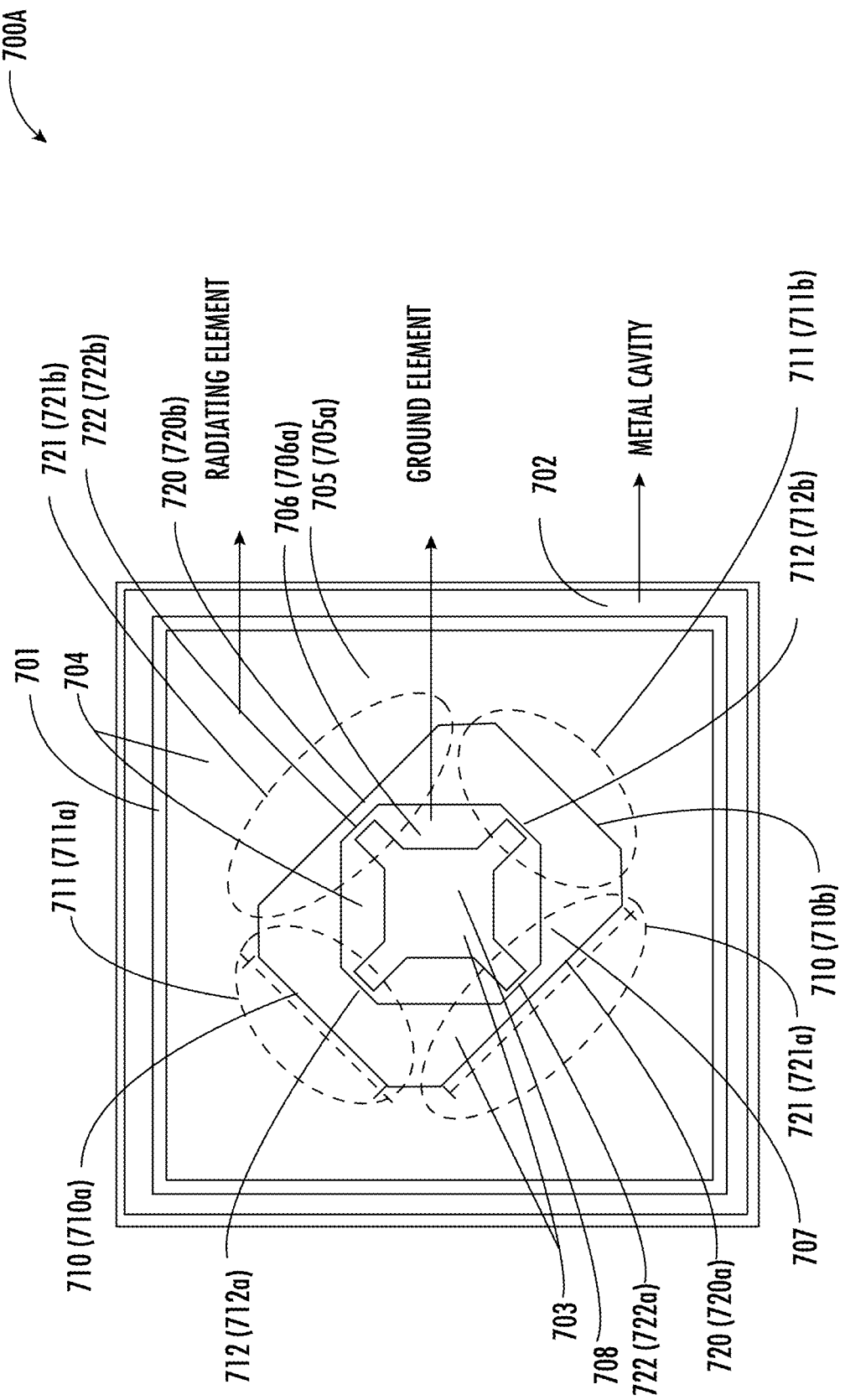
FIG. 7A illustrates an example diagram illustrating an example RFID antenna, in accordance with various embodiments of the present disclosure.

Referring now to FIG. 7A, an example diagram illustrating an example RFID antenna 700A in accordance with some example embodiments described herein is provided. As shown in FIG. 7A, in some examples, the example RFID antenna 700A may comprise a printed circuit board (PCB) 701 and a metal cavity structure 702. For example, the PCB 701 may be positioned in the metal cavity structure 702, such that the metal cavity structure 702 encloses the PCB 701.

In some embodiments, the PCB 701 may comprise a substrate 703 and an etched metal layer 704 on the substrate 703. In some examples, the substrate 103 may be made of a glass-reinforced epoxy laminate material. For example, the substrate 103 may be made of a material of flame retardant (FR4), Teflon, or other PCB materials.

In some embodiments, the etched metal layer 704 may be a single metal layer. For example, the etched metal layer 704 may be an etched single copper layer. In some examples, the etched metal layer 704 may comprise a radiating element 705 and a ground element 706. For example, the radiating element 705 and the ground element 706 may be formed on the substrate 703.

In some embodiments, the radiating element 705 may be configured to transmit or radiate electro-magnetic waves into space or capture incoming electro-magnetic waves for reception, such that the example RFID antenna 700A may be able to communicate with a tag antenna (not shown). For examples, the radiating element 705 may be configured to transmit or radiate an electro-magnetic signal to an RFID passive tag antenna to excite the RFID passive tag antenna. In some examples, tag integrated circuit (IC) information may be transmitted by the RFID passive tag antenna back to the example RFID antenna 700A. In some examples, the electro-magnetic waves radiated from the radiating element 705 may be circularly polarized.

In some embodiments, the radiating element 705 may have a loop structure 705a. For example, the loop structure 705a may be a closed loop structure formed in a shape of a square.

In some examples, the loop structure 705a may comprise two first chamfered edges 710 (e.g., 710a and 710b) formed in first opposite corners 711 (e.g., 711a and 711b) of the loop structure 705a and two second chamfered edges 720 (e.g., 720a and 720b) formed in second opposite corners 721 (e.g., 721a and 721b) of the loop structure 705a. For examples, the two first chamfered edges 710 (e.g., 710a and 710b) may be formed in the first opposite corners 711 (e.g., 711a and 711b) from inside of the loop structure 705a. For examples, the two second chamfered edges 720 (e.g., 720a and 720b) may be formed in the second opposite corners 721 (e.g., 721a and 721b) from inside of the loop structure 705a.

In some examples, each of the two first chamfered edges 710 (e.g., 710a and 710b) and the two second chamfered edges 720 (e.g., 720a and 720b) may be positioned in each of the first opposite corners 711 (e.g., 711a and 711b) or the second opposite corners 721 (e.g., 721a and 721b) from inside of the loop structure 705a, respectively, such that a beveled or angled surface (not shown) is formed. For example, each of the two first chamfered edges 710 (e.g., 710a and 710b) and the two second chamfered edges 720 (e.g., 720a and 720b) may form a sloping transition between adjacent sides of the loop structure 705a.

In some examples, each of the two first chamfered edges 710 (e.g., 710a and 710b) and the two second chamfered edges 720 (e.g., 720a and 720b) may be at 45° with respect to an adjacent side of the loop structure 705a.

In some embodiments, the ground element 706 on the substrate 703 may have a slotted structure 706a concentric with the loop structure 705a. For example, the slotted structure 106a may be a square or rectangular shaped structure with a slot or an opening 708 positioned at the center of the square/rectangular shaped structure. In some examples, a diagonal (not shown) of the slotted structure 706a may be aligned with a diagonal (not shown) of the loop structure 705a.

In some embodiments, the slotted structure 706a may be positioned in an inner region 707 of the loop structure 705a.

In some examples, the slotted structure 706a may comprise two first chamfered edges 712 (e.g., 712a and 712b) and two second chamfered edges 722 (e.g., 722a and 722b) formed on first opposite corners 711 (e.g., 711a and 711b) and second opposite corners 721 (e.g., 721a and 721b) from outside of the slotted structure 706a, respectively. For example, the two first chamfered edges 712 (e.g., 712a and 712b) may be formed on the first opposite corners 711 (e.g., 711a and 711b) from outside of the slotted structure 706a. For examples, the two second chamfered edges 722 (e.g., 722a and 722b) may be formed on the second opposite corners 721 (e.g., 721a and 721b) from the outside of the slotted structure 706a.

In some examples, each of the two first chamfered edges 712 (e.g., 712a and 712b) and two second chamfered edges 722 (e.g., 722a and 722b) of the slotted structure 706a may be positioned outside of each of the first opposite corners 711 (e.g., 711a and 711b) or the second opposite corners 721 (e.g., 721a and 721b) of the slotted structure 706a, respectively, such that a beveled or angled surface (not shown) is formed. For example, each of the two first chamfered edges 712 (e.g., 712a and 712b) of the slotted structure 706a may form a sloping transition between adjacent sides of the slotted structure 706a. For example, each of the two second chamfered edges 722 (e.g., 722a and 722b) of the slotted structure 706a may form a sloping transition between adjacent sides of the slotted structure 706a.

In some embodiments, the first two opposite corners 711 of the slotted structure 706a may be different from the second two opposite corners 721 of the slotted structure 706a.

In some embodiments, each of the two first chamfered edges 710 (e.g., 710a and 710b) of the loop structure 705a has a first width W1. In some embodiments, each of the two second chamfered edges 720 (e.g., 720a and 720b) of the loop structure 705a has a second width W2.

In some examples, the first width W1 may be different from the second width W2.

Figure 7B:
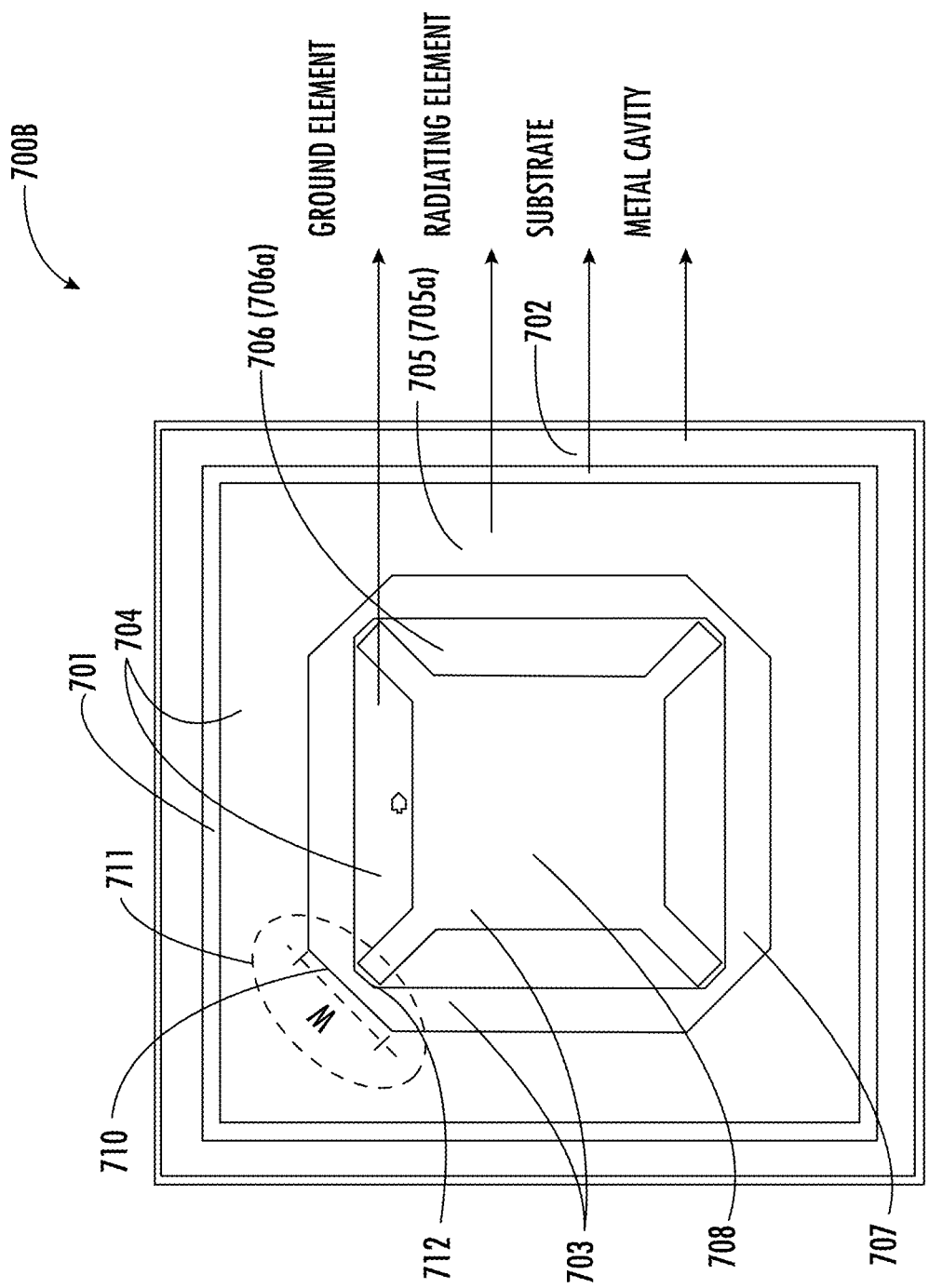
FIG. 7B illustrates an example diagram illustrating an example RFID antenna, in accordance with various embodiments of the present disclosure.
Figure 7C:
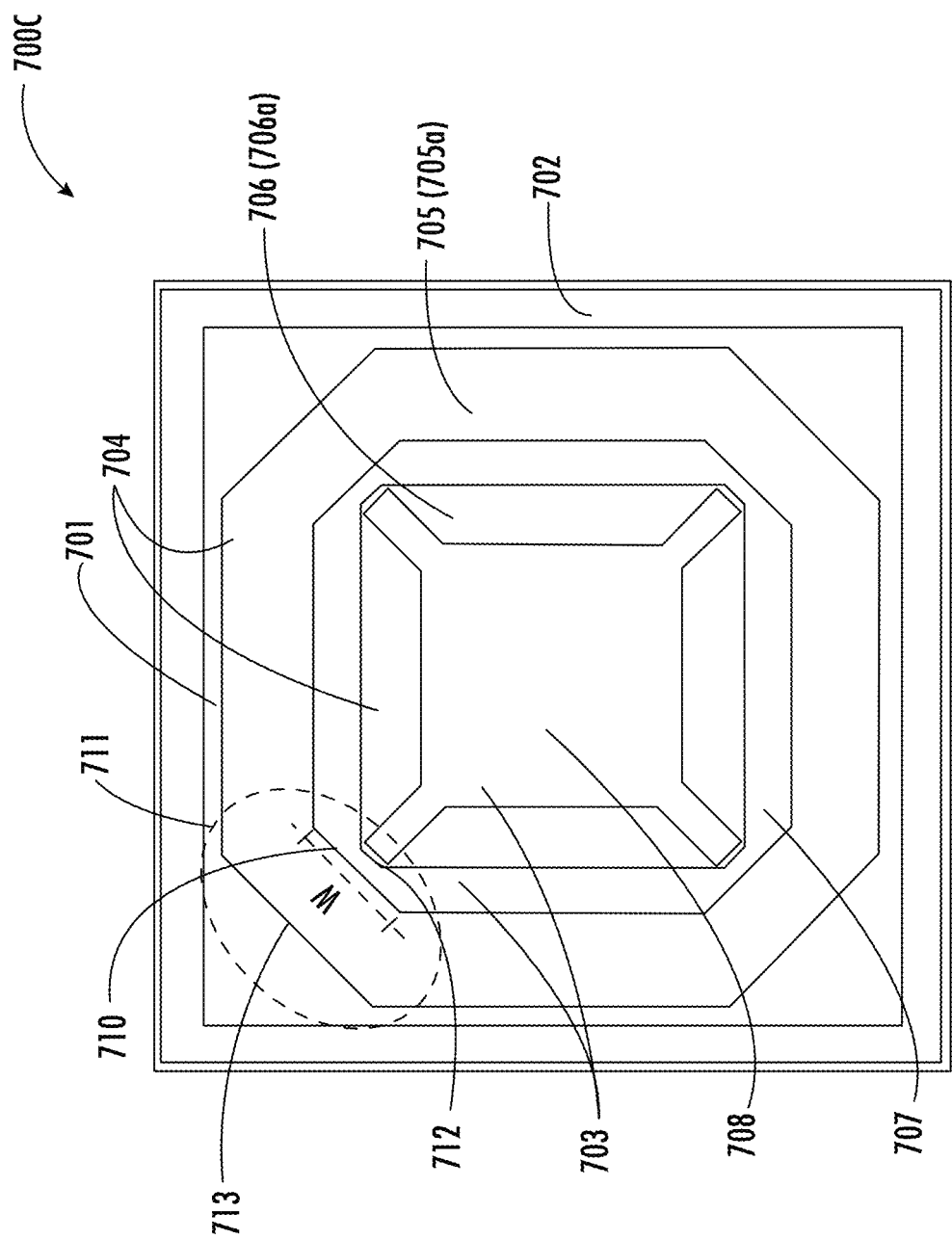
FIG. 7C illustrates an example diagram illustrating an example RFID antenna, in accordance with various embodiments of the present disclosure.
Figure 8:
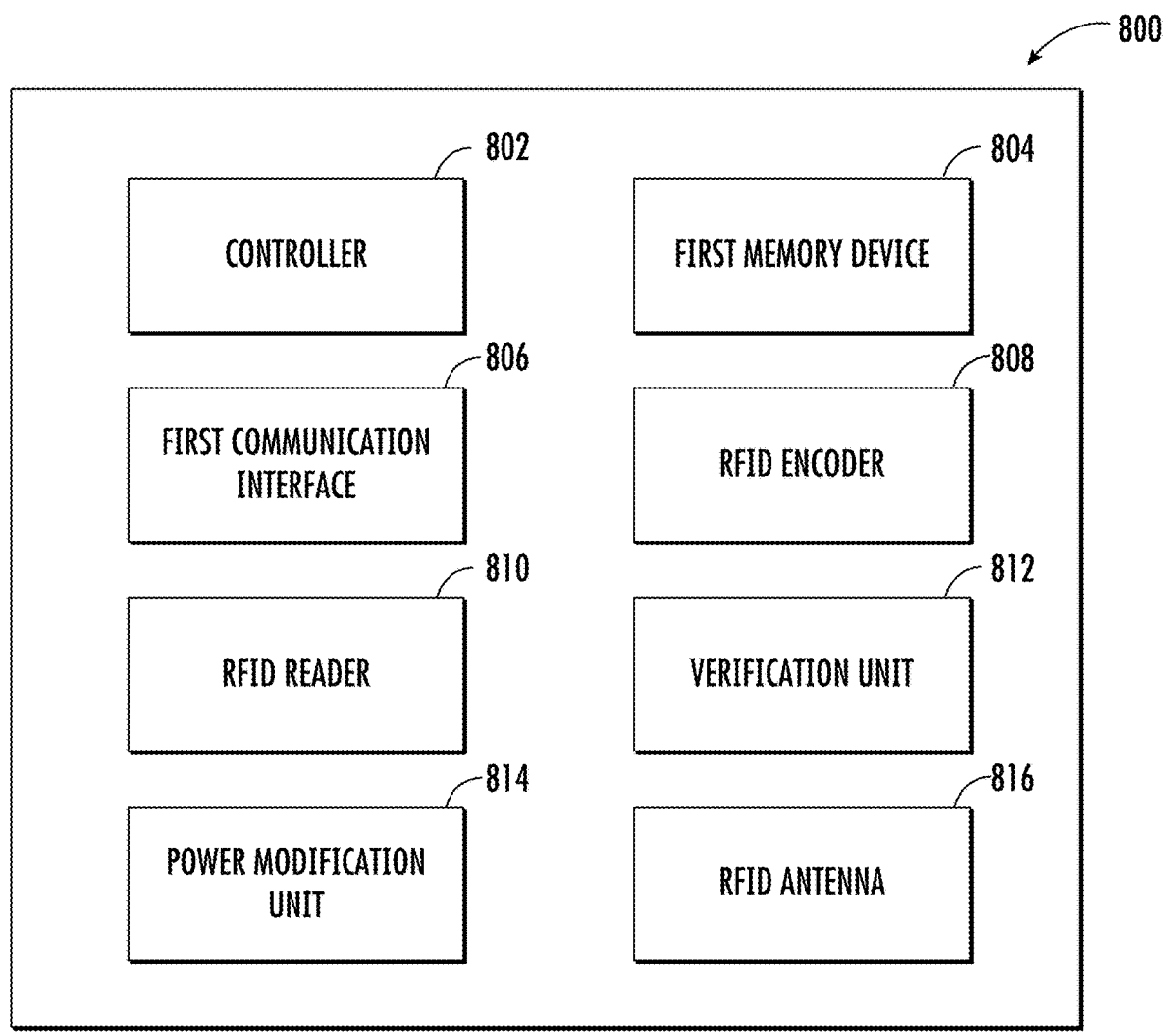
FIG. 8 illustrates a block diagram of an example RFID communication system, in accordance with various embodiments of the present disclosure.

FIG. 8 illustrates a block diagram of an example RFID communication system, according to one or more embodiments described herein. For example, the example RFID communication system 800 may include a controller 802, a first memory device 804, a first communication interface 806, an RFID encoder 808, an RFID reader 810, a verification unit 812, a power modification unit 814, and an RFID antenna 816. In some examples, the RFID antenna 816 of the example RFID communication system 800 described herein may correspond to the RFID antenna 100 as described in FIG. 1, the RFID antenna 400 as described in FIG. 4, the RFID antenna 700A as described in FIG. 7A, the RFID antenna 700B as described in FIG. 7B, and the RFID antenna 700C as described in FIG. 7C.

Referring now to FIG. 7B, an example diagram illustrating an example RFID antenna 700B in accordance with some example embodiments described herein is provided. As shown in FIG. 7B, in some examples, the example RFID antenna 700B may comprise a printed circuit board (PCB) 701 and a metal cavity structure 702. For example, the PCB 701 may be positioned in the metal cavity structure 702, such that the metal cavity structure 702 encloses the PCB 701.

In some embodiments, the PCB 701 may comprise a substrate 703 and an etched metal layer 704 on the substrate 703. In some examples, the substrate 103 may be made of a glass-reinforced epoxy laminate material. For example, the substrate 103 may be made of a material of flame retardant (FR4), Teflon, or other PCB materials.

In some embodiments, the etched metal layer 704 may be a single metal layer. For example, the etched metal layer 704 may be an etched single copper layer. In some examples, the etched metal layer 704 may comprise a radiating element 705 and a ground element 706. For example, the radiating element 705 and the ground element 706 may be formed on the substrate 703.

In some embodiments, the radiating element 705 may be configured to transmit or radiate electro-magnetic waves into space or capture incoming electro-magnetic waves for reception, such that the example RFID antenna 700B may be able to communicate with a tag antenna (not shown). For examples, the radiating element 705 may be configured to transmit or radiate an electro-magnetic signal to an RFID passive tag antenna to excite the RFID passive tag antenna. In some examples, tag integrated circuit (IC) information may be transmitted by the RFID passive tag antenna back to the example RFID antenna 700B.

In some embodiments, the radiating element 705 may have a loop structure 705a. For example, the loop structure 705a may be a closed loop structure formed in a shape of a square.

In some examples, the loop structure 705a may comprise four first chamfered edges 710 formed in four corners 711 of the loop structure 705a. For examples, the four first chamfered edges 710 may be formed in the four corners 711 from inside of the loop structure 705a.

In some examples, each of the four first chamfered edges 710 may be positioned in each of the four corners 711 from inside of the loop structure 705a, respectively, such that a beveled or angled surface (not shown) is formed. For example, each of the four first chamfered edges 710 may form a sloping transition between adjacent sides of the loop structure 705a.

In some examples, each of the four chamfered edges may be at 45° with respect to an adjacent side of the loop structure 705a.

In some embodiments, the ground element 706 on the substrate 703 may have a slotted structure 706a concentric with the loop structure 705a. For example, the slotted structure 106a may be a square or rectangular shaped structure with a slot or an opening 708 positioned at the center of the square/rectangular shaped structure. In some examples, a diagonal (not shown) of the slotted structure 706a may be aligned with a diagonal (not shown) of the loop structure 705a.

In some embodiments, the slotted structure 706a may be positioned in an inner region 707 of the loop structure 705a.

In some examples, the slotted structure 706a may comprise four second chamfered edges 712 formed on the four corners 711 from outside of the slotted structure 706a, respectively. For example, the four second chamfered edges 712 may be formed on the four corners 711 from outside of the slotted structure 706a.

In some examples, each of the four second chamfered edges 712 of the slotted structure 706a may be positioned outside of each of the four corners 711 of the slotted structure 706a, respectively, such that a beveled or angled surface (not shown) is formed. For example, each of the four second chamfered edges 712 of the slotted structure 706a may form a sloping transition between adjacent sides of the slotted structure 706a.

In some embodiments, each of the four first chamfered edges 710 of the loop structure 705a has a same width W. In some examples, the electro-magnetic waves radiated from the radiating element 705 of the example RFID antenna 700B may be linearly polarized.

Referring now to FIG. 7C, an example diagram illustrating an example RFID antenna 700C in accordance with some example embodiments described herein is provided. As shown in FIG. 7C, in some examples, the example RFID antenna 700C may comprise a printed circuit board (PCB) 701 and a metal cavity structure 702. For example, the PCB 701 may be positioned in the metal cavity structure 702, such that the metal cavity structure 702 encloses the PCB 701.

In some embodiments, the PCB 701 may comprise a substrate 703 and an etched metal layer 704 on the substrate 703. In some examples, the substrate 103 may be made of a glass-reinforced epoxy laminate material. For example, the substrate 103 may be made of a material of flame retardant (FR4), Teflon, or other PCB materials.

In some embodiments, the etched metal layer 704 may be a single metal layer. For example, the etched metal layer 704 may be an etched single copper layer. In some examples, the etched metal layer 704 may comprise a radiating element 705 and a ground element 706. For example, the radiating element 705 and the ground element 706 may be formed on the substrate 703.

In some embodiments, the radiating element 705 may be configured to transmit or radiate electro-magnetic waves into space or capture incoming electro-magnetic waves for reception, such that the example RFID antenna 700C may be able to communicate with a tag antenna (not shown). For examples, the radiating element 705 may be configured to transmit or radiate an electro-magnetic signal to an RFID passive tag antenna to excite the RFID passive tag antenna. In some examples, tag integrated circuit (IC) information may be transmitted by the RFID passive tag antenna back to the example RFID antenna 700C.

In some embodiments, the radiating element 705 may have a loop structure 705a. For example, the loop structure 705a may be a closed loop structure formed in a shape of a square.

In some examples, the loop structure 705a may comprise four first chamfered edges 710 formed on four corners 711 of the loop structure 705a. For examples, the four first chamfered edges 710 may be formed in the four corners 711 from inside of the loop structure 705a.

In some examples, each of the four first chamfered edges 710 may be positioned in each of the four corners 711 from inside of the loop structure 705a, respectively, such that a beveled or angled surface (not shown) is formed. For example, each of the four first chamfered edges 710 may form a sloping transition between adjacent sides of the loop structure 705a.

In some examples, each of the four chamfered edges may be at 45° with respect to an adjacent side of the loop structure 705a.

In some embodiments, the loop structure 705a may comprise four second chamfered edges 713 formed on the four corners 711 from outside of the loop structure 705a, respectively. For example, the four second chamfered edges 713 may be formed on the four corners 711 from outside of the loop structure 705a.

In some examples, each of the four second chamfered edges 713 of the loop structure 705a may be positioned outside of each of the four corners 711 of the loop structure 705a, respectively, such that a beveled or angled surface (not shown) is formed. For example, each of the four second chamfered edges 713 of the loop structure 705a may form a sloping transition between adjacent sides of the slotted structure 705a.

In some embodiments, the ground element 706 on the substrate 703 may have a slotted structure 706a concentric with the loop structure 705a. For example, the slotted structure 106a may be a square or rectangular shaped structure with a slot or an opening 708 positioned at the center of the square/rectangular shaped structure. In some examples, a diagonal (not shown) of the slotted structure 706a may be aligned with a diagonal (not shown) of the loop structure 705a.

In some embodiments, the slotted structure 706a may be positioned in an inner region 707 of the loop structure 705a.

In some examples, the slotted structure 706a may comprise four third chamfered edges 712 formed on the four corners 711 from outside of the slotted structure 706a, respectively. For example, the four third chamfered edges 712 may be formed on the four corners 711 from outside of the slotted structure 706a.

In some examples, each of the four third chamfered edges 712 of the slotted structure 706a may be positioned outside of each of the four corners 711 of the slotted structure 706a, respectively, such that a beveled or angled surface (not shown) is formed. For example, each of the four third chamfered edges 712 of the slotted structure 706a may form a sloping transition between adjacent sides of the slotted structure 706a.

In some embodiments, each of the four first chamfered edges 710 of the loop structure 705a has a same width W.

In some embodiments, the example RFID antenna 700C may be configured to tune the a operation frequency of the example RFID antenna 700C.

FIG. 8 illustrates a block diagram of an example RFID communication system, according to one or more embodiments described herein. For example, the example RFID communication system 800 may include a controller 802, a first memory device 804, a first communication interface 806, an RFID encoder 808, an RFID reader 810, a verification unit 812, a power modification unit 814, and an RFID antenna 816. In some examples, the RFID antenna 816 of the example RFID communication system 800 described herein may correspond to the RFID antenna 100 as described in FIG. 1, the RFID antenna 400 as described in FIG. 4, the RFID antenna 700A as described in FIG. 7A, the RFID antenna 700B as described in FIG. 7B, and the RFID antenna 700C as described in FIG. 7C.

The controller 802 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 8 as a single controller, in an embodiment, the controller 802 may include a plurality of controllers and signal processing modules. The plurality of controllers may be embodied on a single electronic device or may be distributed across a plurality of electronic devices collectively configured to function as the circuitry of the example RFID communication system 800. The plurality of controllers may be in operative communication with each other and may be collectively configured to perform one or more functionalities of the circuitry of the example RFID communication system 800, as described herein. In an example embodiment, the controller 802 may be configured to execute instructions stored in the first memory device 804 or otherwise accessible to the controller 802. These instructions, when executed by the controller 802, may cause the circuitry of the example RFID communication system 800 to perform one or more of the functionalities, as described herein.

Whether configured by hardware, firmware/software methods, or by a combination thereof, the controller 802 may include an entity capable of performing operations according to embodiments of the present disclosure while configured accordingly. Thus, for example, when the controller 802 is embodied as an ASIC, FPGA or the like, the controller 802 may include specifically configured hardware for conducting one or more operations described herein. Alternatively, as another example, when the controller 802 is embodied as an executor of instructions, such as may be stored in the first memory device 804, the instructions may specifically configure the controller 802 to perform one or more algorithms and operations described herein.

Thus, the controller 802 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first memory device 804 may include suitable logic, circuitry, and/or interfaces that are adapted to store a set of instructions that is executable by the controller 802 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the first memory device 804 may be integrated with the controller 802 on a single chip, without departing from the scope of the disclosure.

The first communication interface 806 may correspond to a communication interface that may facilitate transmission and reception of messages and data to and from various components of the example RFID communication system 800. Examples of the communication interface may include, but are not limited to, an antenna, an Ethernet port, a USB port, a serial port, or any other port that can be adapted to receive and transmit data. The communication interface transmits and receives data and/or messages in accordance with the various communication protocols, such as, I2C, TCP/IP, UDP, and 2G, 3G, 4G or 5G communication protocols.

The RFID encoder 808 includes suitable logic, and circuitry for encoding the electro-magnetic signal data. In some example embodiments, the RFID encoder 808 encodes the electro-magnetic signal data, according to one or more of Electronic Product code (EPC) or Department of Defense (DOD) formats. In some examples, the RFID encoder 808 may be configured to transmit the data over one or more frequency bands such as, but not limited to, 13.56 MHz (hereinafter "High Frequency band" or "HF") or 860 MHz-960 MHz (hereinafter "UHF band"), through the RFID antenna 816. Further, the RFID encoder 808 may be configured to modulate the data on an RF carrier of either HF frequency band or UHF band prior to transmitting the data. Some examples of the modulation techniques utilized by the RFID encoder 808 include, but are not limited to, Phase Jitter Modulation (PJM), Amplitude Shift Keying (ASK), and/or the like.

In some examples, the RFID encoder 808 may be configured to transmit one or more commands to an RFID passive tag antenna, causing the RFID passive tag antenna to perform a predetermined operation in accordance with the one or more commands. For example, the RFID encoder 808 may transmit a command "Write" that indicates to the RFID passive tag antenna to write the data accompanied with the command in the memory of the RFID passive tag antenna. Similarly, the RFID encoder 808 may transmit other commands to the RFID passive tag antenna such as but not limited to "Lock", "Access", "Block Write", and/or any other command according to the EPC global standards.

The RFID reader 810 includes suitable logic and circuitry for reading data from the RFID passive tag antenna. To read the data encoded in the RFID passive tag antenna, the RFID reader 810 may transmit an interrogation command to the RFID inlay over the one or more frequency bands such as HF and UHF. Further, similar to the RFID encoder 808, the RFID reader 810 may also utilize the one or more modulation techniques such as ASK and PJM to transmit the interrogation command on the one or more frequency bands. In response to the interrogation command, the RFID reader 810 may receive the encoded data from the RFID passive tag antenna. In an example embodiment, the RFID reader 810 may utilize the RFID antenna 816 to transmit the interrogation command and receive the encoded data from the RFID passive tag antenna.

In some examples, both the RFID reader 810 and the RFID encoder 808 may include one or more of filters, analog to digital (A/D) converters, Digital to Analog (D/A) convertors, matching circuits, amplifiers, and/or tuners that enable the RFID reader 810 and the RFID encoder 808 to transmit and receive data over the one or more frequency bands through the RFID antenna 816.

The verification unit 812 includes suitable logic and circuitry that is configured to verify whether the encoding of the RFID passive tag antenna is successful. In some examples, to determine whether the encoding is successful, the verification unit 812 may determine an encode success rate. The verification unit 812 may be implemented using one or more hardware components, such as, but not limited to, FPGA, ASIC, and the like.

The power modification unit 814 includes suitable logic and circuitry that is configured to manage a signal transmission power of the RFID antenna 816. In an example embodiment, the signal transmission power corresponds to a transmitter power output at which a signal is transmitted from the RFID antenna 816. In an example embodiment, the power modification unit 814 may be configured to modify the signal transmission power in accordance with a plurality of power settings. In an example embodiment, a power setting may correspond to a value of the signal transmission power with which the data is transmitted from the RFID antenna 816. In some examples, the power modification unit 814 may modify input voltage to the RFID antenna 816 to modify the signal transmission power. In an example embodiment, the power modification unit 814 may modify the signal transmission power in response to an instruction received from the controller 802. The power modification unit 814 may be implemented using one or more hardware components, such as, but not limited to, FPGA, ASIC, and the like.

Figure 9:
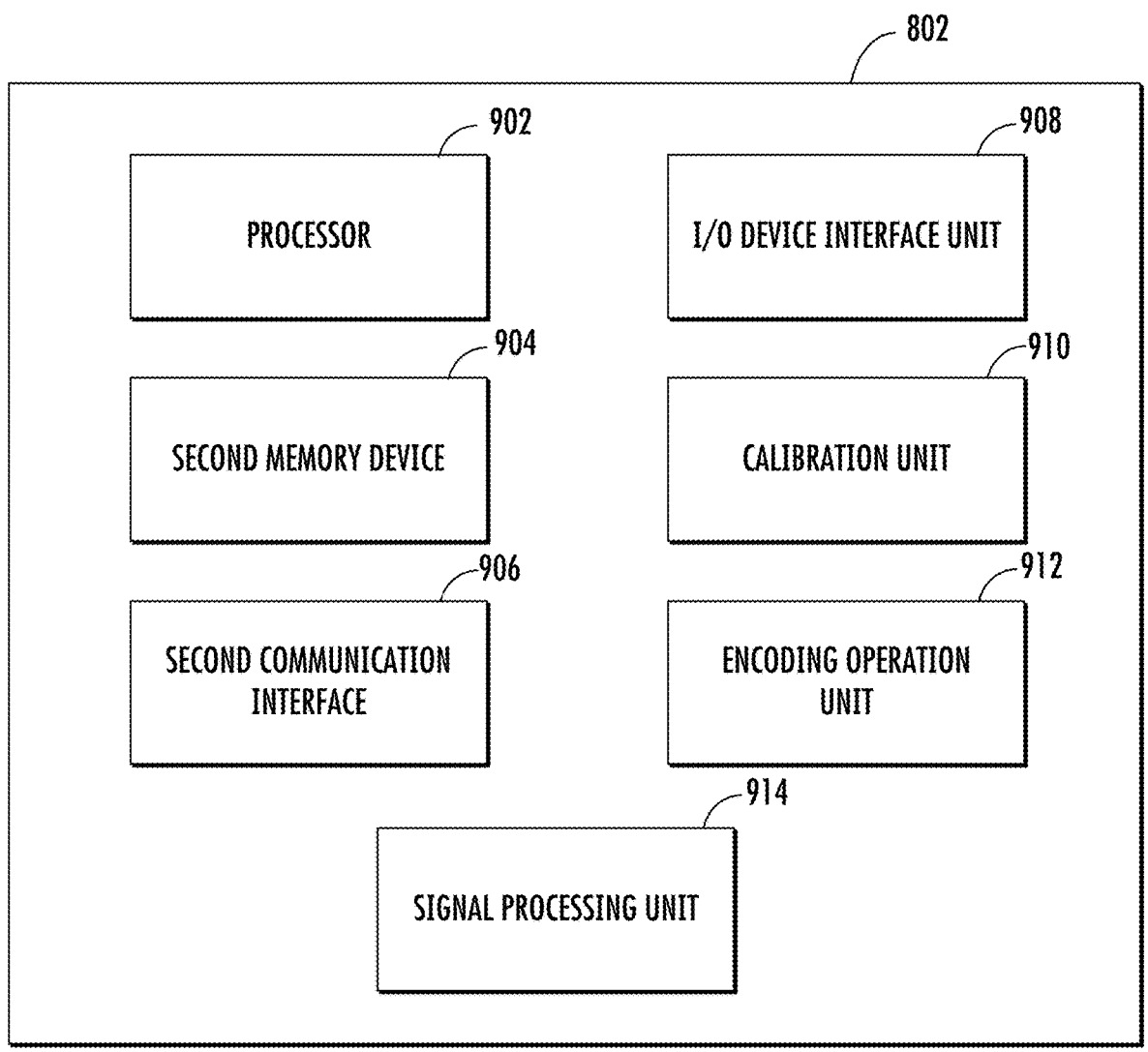
FIG. 9 illustrates a block diagram of an example controller of the example RFID communication system, in accordance with various embodiments of the present disclosure.

FIG. 9 illustrates a block diagram of the controller 802 of the example RFID communication system 800, according to one or more embodiments described herein. The controller 802 includes a processor 902, a second memory device 904, a second communication interface 906, an input/output (I/O) device interface unit 908, a calibration unit 910, an encoding operation unit 912, and a signal processing unit 914.

The processor 902 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 9 as a single processor, in an embodiment, the processor 902 may include a plurality of processors and signal processing modules. The plurality of processors may be embodied on a single electronic device or may be distributed across a plurality of electronic devices collectively configured to function as the circuitry of the controller 802. The plurality of processors may be in operative communication with each other and may be collectively configured to perform one or more functionalities of the circuitry of the controller 802, as described herein. In an example embodiment, the processor 902 may be configured to execute instructions stored in the second memory device 904 or otherwise accessible to the processor 902. These instructions, when executed by the processor 902, may cause the circuitry of the controller 802 to perform one or more of the functionalities, as described herein.

Whether configured by hardware, firmware/software methods, or by a combination thereof, the processor 902 may include an entity capable of performing operations according to embodiments of the present disclosure while configured accordingly. Thus, for example, when the processor 902 is embodied as an ASIC, FPGA or the like, the processor 902 may include specifically configured hardware for conducting one or more operations described herein. Alternatively, as another example, when the processor 902 is embodied as an executor of instructions, such as may be stored in the second memory device 904, the instructions may specifically configure the processor 902 to perform one or more algorithms and operations described herein.

Thus, the processor 902 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The second memory device 904 may include suitable logic, circuitry, and/or interfaces that are adapted to store a set of instructions that is executable by the processor 902 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the second memory device 904 may be integrated with the processor 902 on a single chip, without departing from the scope of the disclosure.

The second communication interface 906 may correspond to a second communication interface 906 that may facilitate transmission and reception of messages and data to and from various devices. For example, the second communication interface 906 is communicatively coupled with a computing device (not shown). For example, through the second communication interface 906, the example RFID communication system 800 may be configured to receive commands/jobs from the computing device based on which the example RFID communication system 800 may perform predetermined operation. Examples of the second communication interface 906 may include, but are not limited to, an antenna, an Ethernet port, a USB port, a serial port, or any other port that can be adapted to receive and transmit data. The second communication interface 906 transmits and receives data and/or messages in accordance with the various communication protocols, such as, I2C, TCP/IP, UDP, and 2G, 3G, 4G or 5G communication protocols.

The I/O device interface unit 908 may include suitable logic and/or circuitry that may be configured to communicate with the one or more components of the example RFID communication system 800, in accordance with one or more device communication protocols such as, but not limited to, I2C communication protocol, Serial Peripheral Interface (SPI) communication protocol, Serial communication protocol, Control Area Network (CAN) communication protocol, and 1-Wire® communication protocol. In an example embodiment, the I/O device interface unit 908 may communicate with other components of the example RFID communication system 800. Some examples of the I/O device interface unit 908 may include, but not limited to, a Data Acquisition (DAQ) card, an electrical drives driver circuit, and/or the like.

The calibration unit 910 may include suitable logic and/or circuitry for calibrating the example RFID communication system 800. In an example embodiment, the calibration unit 910 may be configured to determine one or more properties of the example RFID antenna 800. The calibration unit 910 may be implemented using one or more hardware components, such as, but not limited to, FPGA, ASIC, and the like.

The encoding operation unit 912 may include suitable logic and/or circuitry for operating the example RFID communication system 800 in the encoding mode. In an example embodiment, the encoding operation unit 912 may be configured to cause the RFID encoder 808 in the example RFID communication system 800 to encode the RFID passive tag antenna, through the RFID antenna 816. The encoding operation unit 912 may be implemented using one or more hardware components, such as, but not limited to, FPGA, ASIC, and the like.

The signal processing unit 914 may include suitable logic and/or circuitry for analyzing the input signal received from a media sensor. For example, the signal processing unit 914 may include a digital signal processor (e.g., 902) that may be configured to identify the peaks and the valleys in the input signal. Further, the signal processing unit 914 may utilize one or more signal processing techniques such as, but not limited to, Fast Fourier Transform (FFT), Discrete Fourier Transform (DFT), Discrete Time Fourier Transform (DTFT) to analyze the input signal. The signal processing unit 914 may be implemented using one or more hardware components, such as, but not limited to, FPGA, ASIC, and the like.

In some examples the scope of the disclosure is not limited to having a separate controller 802 for the example RFID communication system 800. In an alternative embodiment, various units/modules of the controller 802 may be implemented on example RFID communication system 800, forming an integrated, single apparatus, without departing from the scope of the disclosure. In another alternative embodiment, various functionalities of the example RFID communication system 800 may be implemented in the controller 802, forming an integrated, single apparatus, without departing from the scope of the disclosure. In such an implementation, the RFID antenna 816 may be directly communicatively coupled to the controller 802.

As described above and as will be appreciated based on this disclosure, embodiments of the present disclosure may include various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. A radio frequency identification (RFID) antenna, comprising a printed circuit board (PCB), wherein the PCB comprises:
   a substrate;
   an etched metal layer on the substrate, wherein the etched metal layer comprises:
      a radiating element positioned on the substrate having a loop structure, wherein the loop structure comprises two first chamfered edges formed in first opposite corners of the loop structure and two second chamfered edges formed in second opposite corners of the loop structure, wherein:
         the two first chamfered edges of the loop structure have a first width,
         the two second chamfered edges of the loop structure have a second width, and
         the first width is different from the second width; and
      a ground element positioned on the substrate having a slotted structure that is concentric with the loop structure and is positioned in an inner region of the loop structure, wherein the slotted structure comprises two first chamfered edges on first two opposite corners of the slotted structure and two second chamfered edges on second two opposite corners of the slotted structure.

2. The RFID antenna according to claim 1, further comprising:
   a metal cavity structure, wherein the metal cavity structure encloses the PCB, such that a radiation of electro-magnetic waves from the radiating element emits a directional radiation pattern.

3. The RFID antenna according to claim 2, wherein the metal cavity structure comprises a metal backplate and metal wall plates, wherein the metal backplate is positioned on a side of the substrate away from the etched metal layer and the metal wall plates are positioned on sidewalls of PCB.

4. The RFID antenna according to claim 3, wherein:
   the metal cavity structure further comprises a plastic sheet to cover the PCB in the metal cavity structure.

5. The RFID antenna according to claim 1, wherein the substrate is made of a material of flame retardant (FR4) or Teflon.

6. The RFID antenna according to claim 1, wherein:
   the slotted structure further comprises chamfered edges on at least two opposite corners of the slotted structure.

7. The RFID antenna according to claim 1, wherein:
   the loop structure is a square loop structure, and
   each of the two first chamfered edges of the loop structure is at 45° with respect to an adjacent side of the loop structure.

8. The RFID antenna according to claim 1, wherein:
   each of the two second chamfered edges of the loop structure is at 45° with respect to an adjacent side of the loop structure.

9. The RFID antenna according to claim 1, wherein:
   electro-magnetic waves radiated from the radiating element are circularly polarized.

10. The RFID antenna according to claim 1, wherein:
    the loop structure is a square loop structure, and
    each of the two first chamfered edges of the loop structure is at 45° with respect to an adjacent side of the loop structure.

11. A radio frequency identification (RFID) communication system comprising:
    an RFID antenna, wherein the RFID antenna comprise a printed circuit board (PCB) and the PCB comprises:
       a substrate;
       an etched metal layer on the substrate, wherein the etched metal layer comprises:
          a radiating element positioned on the substrate having a loop structure, wherein the loop structure comprises two first chamfered edges formed in first opposite corners of the loop structure and two second chamfered edges formed in second opposite corners of the loop structure, wherein:
             the two first chamfered edges of the loop structure have a first width,
             the two second chamfered edges of the loop structure have a second width, and
             the first width is different from the second width; and
          a ground element positioned on the substrate having a slotted structure that is concentric with the loop structure and is positioned in an inner region of the loop structure, wherein the slotted structure comprises two first chamfered edges on first two opposite corners of the slotted structure and two second chamfered edges on second two opposite corners of the slotted structure.

12. The RFID communication system according to claim 11, further comprising:
    a controller, communicatively coupled to the radiating element and the ground element, wherein the controller is configured to cause the radiating element to transmit or radiate electro-magnetic waves into space or capture incoming electro-magnetic waves for reception.

13. The RFID communication system according to claim 11, further comprising:
    a metal cavity structure, wherein the metal cavity structure encloses the PCB, such that a radiation of electro-magnetic waves from the radiating element emits a directional radiation pattern.

14. The RFID communication system according to claim 13, wherein the metal cavity structure comprises a metal backplate and metal wall plates, wherein the metal backplate is positioned on a side of the substrate away from the etched metal layer and the metal wall plates are positioned on sidewalls of PCB.

15. The RFID communication system according to claim 14, wherein:
   the metal cavity structure further comprises a plastic sheet to cover the PCB in the metal cavity structure.

16. The RFID communication system according to claim 11, wherein:
   the slotted structure further comprises chamfered edges on at least two opposite corners of the slotted structure.

17. A radio frequency identification (RFID) antenna, comprising a printed circuit board (PCB), wherein the PCB comprises:
   a substrate;
   an etched metal layer on the substrate, wherein the etched metal layer comprises:
   a radiating element positioned on the substrate having a loop structure, wherein the loop structure comprises four first chamfered edges positioned in four corners from inside of the loop structure and four second chamfered edges positioned on the four corners from outside of the loop structure; and
   a ground element positioned on the substrate having a slotted structure that is concentric with the loop structure and positioned in an inner region of the loop structure, wherein the slotted structure further comprises four third chamfered edges on the four corners of the slotted structure.

* * * * *